(12) United States Patent
Clarke et al.

(10) Patent No.: US 10,185,096 B2
(45) Date of Patent: Jan. 22, 2019

(54) FERRULE-CORE CONCENTRICITY MEASUREMENT SYSTEMS AND METHODS

(71) Applicant: Corning Optical Communications LLC, Hickory, NC (US)

(72) Inventors: Sterling Michael Clarke, Corning, NY (US); John Joseph Costello, III, Virginia Beach, VA (US); En Hong, Painted Post, NY (US); Garrett Andrew Piech, Corning, NY (US); Michael Brian Webb, Lindley, NY (US); Elvis Alberto Zambrano, Wilmington, NC (US)

(73) Assignee: Corning Optical Communications LLC, Hickory, NC (US)

( * ) Notice: Subject to any disclaimer, the term of this patent is extended or adjusted under 35 U.S.C. 154(b) by 23 days.

(21) Appl. No.: 15/441,512

(22) Filed: Feb. 24, 2017

(65) Prior Publication Data

US 2017/0160487 A1 Jun. 8, 2017

Related U.S. Application Data

(62) Division of application No. 14/571,557, filed on Dec. 16, 2014, now Pat. No. 9,612,177.

(Continued)

(51) Int. Cl.
*G01B 1/00* (2006.01)
*G01J 1/00* (2006.01)
(Continued)

(52) U.S. Cl.
CPC .............. *G02B 6/385* (2013.01); *G01B 11/14* (2013.01); *G01M 11/33* (2013.01); *G02B 6/3834* (2013.01); *G02B 6/3843* (2013.01)

(58) Field of Classification Search
CPC ...... G01B 11/14; G01M 11/33; G02B 6/3834; G02B 6/3843
(Continued)

(56) References Cited

U.S. PATENT DOCUMENTS 4,441,026 A 4/1984 Moriwaki et al.
4,994,679 A 2/1991 Esser et al.
(Continued)

FOREIGN PATENT DOCUMENTS

FR 2516648 11/1981
JP 58143205 A 8/1983
(Continued)

OTHER PUBLICATIONS

"Active alignment process reduces fiber-core offsets," Graf, Mark. Taugwalder, Frederic. Laser Focus World vol. 32, Issue 7, Jul. 1996, pp. 4.
(Continued)

*Primary Examiner* — Sunghee Y Gray
(74) *Attorney, Agent, or Firm* — Adam R. Weeks

(57) ABSTRACT

Systems and methods of measuring ferrule-core concentricity for an optical fiber held by a ferrule are disclosed. The method includes: generating ferrule distance data by measuring distances to a ferrule outside surface as a function of rotation angle using a distance sensor and rotating either the ferrule or the distance sensor about an axis of rotation that is off-center from the true ferrule axis; aligning the axis of rotation with the fiber core; using the ferrule distance data to determine a position of the true ferrule center relative to the optical fiber core; and measuring the concentricity as the distance between the true center of the ferrule and the optical fiber core.

10 Claims, 14 Drawing Sheets

Related U.S. Application Data

(60) Provisional application No. 61/918,080, filed on Dec. 19, 2013.

(51) Int. Cl.
  *G06K 9/00*  (2006.01)
  *G02B 6/00*  (2006.01)
  *G02B 6/38*  (2006.01)
  *G01B 11/14*  (2006.01)
  *G01M 11/00*  (2006.01)

(58) Field of Classification Search
  USPC .................. 356/150, 73.1; 382/151; 385/134
  See application file for complete search history.

(56) References Cited

U.S. PATENT DOCUMENTS

| | | | |
|---|---|---|---|
| 5,367,372 A | 11/1994 | Divita et al. | |
| 5,379,112 A | 1/1995 | Ollivier et al. | |
| 5,729,622 A | 3/1998 | Csipkes et al. | |
| 5,768,409 A | 6/1998 | Csipkes et al. | |
| 6,011,616 A | 1/2000 | Volcy et al. | |
| 7,079,743 B2 | 7/2006 | Lauzier et al. | |
| 2005/0196115 A1 | 9/2005 | Kim et al. | |
| 2005/0211885 A1 | 9/2005 | Tobiason et al. | |
| 2008/0198370 A1 | 8/2008 | Cherel | |
| 2013/0342852 A1* | 12/2013 | Fujimoto | G01B 11/14 356/614 |
| 2014/0327735 A1* | 11/2014 | Ruchet | G02B 6/385 348/40 |
| 2016/0033325 A1* | 2/2016 | Fusco | G01J 1/30 356/73.1 |

FOREIGN PATENT DOCUMENTS

| | | |
|---|---|---|
| JP | 61221632 A | 10/1986 |
| JP | 0829642 A | 2/1996 |
| WO | 2014195893 A1 | 12/2014 |

OTHER PUBLICATIONS

International Search Report and Written Opinion PCT/US2014/07559 dated Mar. 23, 2015, 12 pages.

* cited by examiner

θ (radians)

θ (radians)

FERRULE-CORE CONCENTRICITY MEASUREMENT SYSTEMS AND METHODS

CROSS-REFERENCE TO RELATED APPLICATIONS

This application is a divisional application of U.S. application Ser. No. 14/571557, filed Dec. 16, 2014, which claims the benefit of priority to U.S. Provisional Application Ser. No. 61/918,080, filed on Dec. 19, 2013, the content of both applications being relied upon and incorporated herein by reference in its entirety.

FIELD

The present disclosure relates to optical fibers that are held in ferrules, and in particular relates to systems and methods for measuring the concentricity of the fiber core of the optical fiber with respect to the ferrule

BACKGROUND

Optical fiber connectors are used to route light from one optical fiber to another, or to connect an optical fiber to a device such as a light source or a detector. When optically connecting one optical fiber to another, the cores of the two optical fibers need to be accurately aligned with one another so that the maximum amount of light is transferred between the fiber cores, i.e., so that the insertion loss is minimized. For single-mode fibers at telecommunications wavelengths (e.g. 1310 nm, 1550 nm), the core diameter is about 8 microns and the mode-field diameter is about 10 microns. To keep the insertion loss below 0.25 dB (~5%), the radial offset between the two coupled fibers needs to be less than 1.1 microns.

To facilitate meeting this alignment tolerance, optical fiber connectors include a ferrule that holds the optical fiber. A ferrule is a cylindrical sleeve having a central bore sized to accommodate the bare (stripped) end of the optical fiber. The ferrule typically has a diameter ranging from 1.25 mm to 2.50 mm, and is precision made so that the central bore is located to within about 1 micron of true center, and the ferrule outer surface is within about 0.5 micron of true round. The ferrule is generally made of a hard material, e.g., a ceramic such as zirconia, so that it can be mechanically held and serve as a mechanical reference when engaging the connector with another connector or with a device.

There are a number of different sources of insertion loss, including fiber bends, poor polishing, contamination of the connectors' surfaces, fiber endface angles and shapes, and tolerance errors on the fiber core position relative to the ferrule true center, which is referred to herein as the core-ferrule concentricity. It is therefore important to have a fast and accurate way of measuring the position of the fiber core within the ferrule so that this particular loss mechanism can be identified and characterized to see if it is a limiting factor in establishing a suitable optical connection. The measurement of core-ferrule concentricity has become particularly important in view of increasingly stringent requirements on connector insertion loss.

SUMMARY

An aspect of the disclosure is a system for measuring a concentricity between an optical fiber core of an optical fiber held in a central bore of a ferrule and a true center of the ferrule, wherein the ferrule has a ferrule outer surface and a ferrule front end, and wherein a section of the optical fiber resides in the central bore of the ferrule at the ferrule front end. The system includes: a movable ferrule holder configured to hold the ferrule; a light source configured to be optically coupled to the optical fiber and emit light that travels through the optical fiber core and out of a front end of the optical fiber; a distance sensor arranged to measure a ferrule distance to the ferrule outer surface; a core sensor arranged to receive and detect light emitted from the core of the optical fiber at the ferrule front end; a rotatable support member that supports the distance sensor and the core sensor relative to the ferrule, the rotatable support member being configured to simultaneously rotate the distance sensor and core sensor about an axis of rotation that is generally aligned with the optical fiber core at the ferrule front end, wherein the distance sensor is configured to measure ferrule distance data during rotation and the core sensor is configured to measure core location data during rotation; and a computer that receives the ferrule distance data and the core location data and that calculates therefrom the true center of the ferrule and the concentricity as a distance between the optical fiber core and the true center of the ferrule.

Another aspect of the disclosure is a method of measuring a concentricity between an optical fiber core of an optical fiber held by a ferrule and a true center of the ferrule. The method includes: generating ferrule distance data by measuring distances to a ferrule outside surface as a function of rotation angle using a distance sensor and rotating either the ferrule or the distance sensor about an axis of rotation that is off-center from the true ferrule axis; generating core location data about the optical fiber core by coupling light from the optical fiber core into a core sensor; using the ferrule distance data and core location data to determine a position of the true ferrule center relative to the optical fiber core; and measuring the concentricity as the distance between the true center of the ferrule and the optical fiber core.

Another aspect of the disclosure is a method of measuring a concentricity between an optical fiber core of an optical fiber held by a ferrule and a true center of the ferrule. The method includes: generating ferrule distance data by measuring distances to a ferrule outside surface as a function of rotation angle using a distance sensor and rotating either the ferrule or the distance sensor about an axis of rotation that is off-center from the true ferrule axis; aligning the axis of rotation with the fiber core; using the ferrule distance data to determine a position of the true ferrule center relative to the optical fiber core; and measuring the concentricity as the distance between the true center of the ferrule and the optical fiber core.

Another aspect of the disclosure is a method of measuring a concentricity between an optical fiber core of an optical fiber held by a ferrule and a true center of the ferrule. The method includes: generating ferrule distance data by measuring distances to a ferrule outside surface as a function of rotation angle using a distance sensor and rotating either the ferrule or the distance sensor about an axis of rotation that is off-center of the true ferrule axis; measuring a path of the optical fiber core during said rotating; using the ferrule distance data and the measured path of the optical fiber core to determine a position of the true ferrule center relative to the optical fiber core; and measuring the concentricity as the distance between the true center of the ferrule and the optical fiber core.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

The entire disclosure of any publication or patent document mentioned herein is incorporated by reference.

Cartesian coordinates are shown in some of the Figures for the sake of reference and are not intended to be limiting as to direction or orientation.

Figure 1:
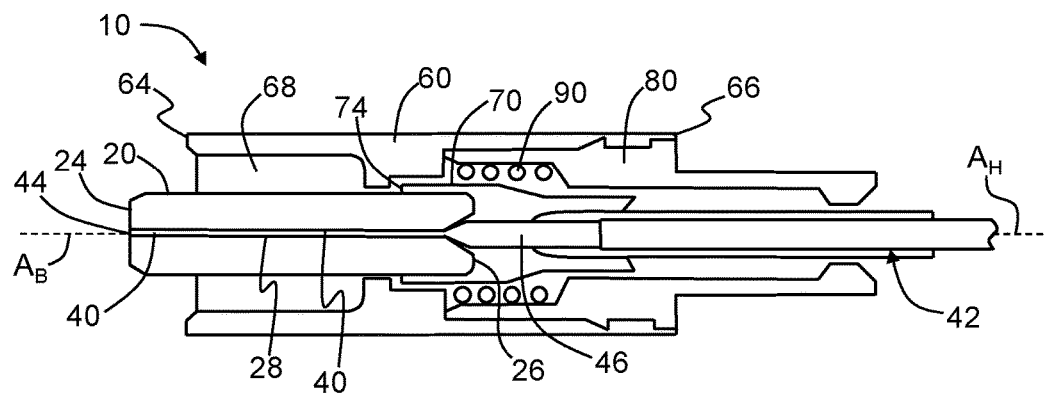
FIG. 1 is a cross-sectional view of an example optical fiber connector sub-assembly that operably supports a ferrule that in turn supports an optical fiber.
Figure 2:
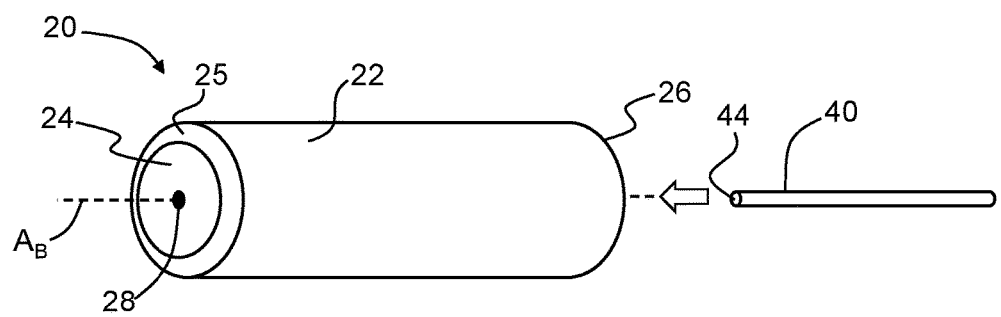
FIG. 2 is a front elevated view of the ferrule of FIG. 1, showing how the optical fiber is inserted into the ferrule central bore.
Figure 3:
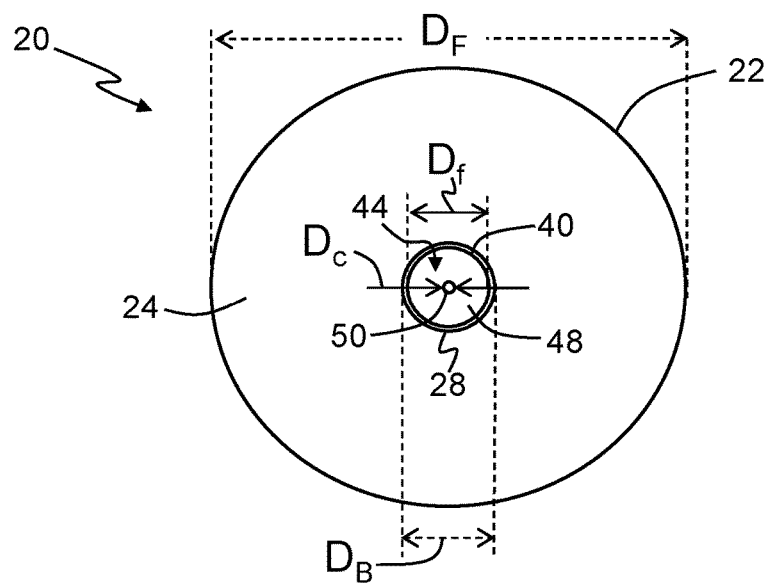
FIG. 3 is a close-up end-on view of the ferrule of FIG. 2.

FIG. 1 is a cross-sectional view of an example optical fiber connector sub-assembly ("connector sub-assembly") 10 that operably supports a ferrule 20. FIG. 2 is a front elevated view of an example ferrule 20, while FIG. 3 is a close-up end-on view of the ferrule. Ferrule 20 has an outer surface 22, a front end 24, a back end 26, and a central bore 28 that has a central axis $A_B$. Central bore 28 is nominally centered on the true center of ferrule 20, i.e., to within a manufacturing tolerance, e.g., 1 μm. Central bore 28 is sized to hold a bare optical fiber section ("bare fiber section") 40 formed at an end of a tight-buffered optical fiber 42. Bare fiber section 40 has a front end 44 that resides at ferrule front end 24. With reference to FIG. 3, ferrule 20 has an outside diameter $D_F$ while central bore 28 has a diameter $D_B$. In an example, $D_F$=2.5 mm or 1.25 mm, and $D_B$=126 μm, while bare fiber section 40 has a diameter $D_f$=125 μm. In an example, ferrule 20 includes a beveled section 25 at the front end 24 adjacent outer surface 22 which transitions from the diameter of the front end 24 to the diameter of the outer surface 22.

With reference again to FIG. 1, connector sub-assembly 10 includes a housing 60 having a front end 64, a back end 66, an interior 68 and a central axis $A_H$. Housing interior 68 includes a ferrule holder 70 that resides within housing interior 68 and along housing axis $A_H$. Ferrule holder 70 has an open front end 74 that holds ferrule 20 at ferrule back end 26 so that ferrule front end 24 extends beyond the housing front end 64. Ferrule holder 70 is supported within a lead-in tube 80 that engages housing 60 at housing back end 66 and that extends into housing interior 68. A spring 90 resides in an interior of housing 60 and surrounds a portion of ferrule holder 20. An epoxy 46 is used to hold optical fiber 42 in place within ferrule holder 70 as well as to hold bare optical fiber section 40 within bore 28 of ferrule 20.

The close-up end-view of ferrule 20 of FIG. 3 shows the front end 44 of bare fiber section 40 at the front end 24 of ferrule 20. Bare fiber section 40 includes a cladding region 48 that surrounds a central core 50, which has a refractive index $n_0$ and a diameter $D_c$. Core 50 and the surrounding cladding 48 define an optical waveguide that supports guided light having a mode-field diameter $D_{MF}$ measured at the $1/e^2$ intensity threshold. In an example, the mode-field diameter $D_{MF}$ is about 10 μm.

For telecommunications applications, single-mode optical fibers are typically designed to operate at nominal wavelengths of 1310 nm or 1550 nm and have an overall diameter $D_f$ (core and cladding) of nominally 125 μm. In an example, bare fiber section 40 of optical fiber 42 is epoxied or otherwise secured into ferrule central bore 28, which as noted above is only slightly larger than the bare optical fiber section. The ferrule outside diameter $D_F$ is typically 2.500 mm, although in some cases it can be 1.250 mm. Ferrule 20 is used as the mechanical reference in a bulkhead connection that places two terminated fiber connectors against each other. A bulkhead connector is used to place two of these "ferrulized" fibers in physical contact with one another. The performance of the connection depends on a number of factors such as end face cleanliness, polish angle, the exact matching of the mode field diameters, core-ferrule concentricity, how the well fiber cores 50 are axially aligned, etc.

Figure 4:
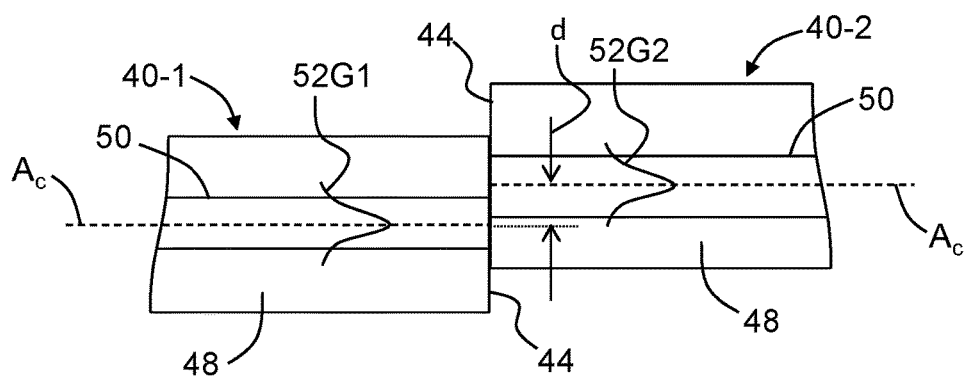
FIG. 4 shows end portions of two bare optical fiber sections interfaced at their respective front ends and shown as having a radial offset distance d.

FIG. 4 shows end portions of two bare fiber sections 40-1 and 40-2 interfaced at their respective front ends 44 and offset by radial offset distanced. Each of the cores 50 has a core axis $A_c$. Guided light 52G1 and 52G2 is shown traveling in respective bare fiber sections 40-1 and 40-2. The cores 50 of bare fiber sections 40-1 and 40-2 are laterally (radially) offset by a radial offset distance d. The dominant source of optical power loss in a fiber-to-fiber optical connection is simply the radial offset distanced of the two interfaced fiber cores 50. Equation (1) below expresses the (normalized) coupling efficiency CE as a general function of the radial offset distance d, the mode field radii $\omega_1$, $\omega_2$ of guided light 52G1 and 52G1 respectively traveling in bare fiber sections 40-1 and 40-2, the tilt angle θ of front ends 44 relative to one another, the index of refraction $n_0$ of the fiber core 50, and the operating wavelength λ.

$$CE = \frac{(2\omega_1\omega_2)^2}{(\omega_1^2+\omega_2^2)^2} \exp\left[\frac{-2d^2}{\omega_1^2+\omega_2^2} - 2\pi^2 \frac{n_0^2}{\lambda^2} \frac{(\omega_1^2\omega_2^2)}{(\omega_1^2+\omega_2^2)} \sin^2(\theta)\right] \quad (1)$$

Typical angle tolerances in the parts are such that the tilt angle θ is generally negligible so that sin (θ)→0. In addition, when bare fiber sections 40-1 and 40-2 are the same type, the mode field radii are equal ($\omega_1=\omega_2=\omega$), so that equation (1) reduces to equation (2):

$$CE = \exp\left[\frac{-d^2}{\omega^2}\right] \quad (2)$$

Equation (2) is a Gaussian function that drops off as the radial offset distance d increases.

Figure 5:
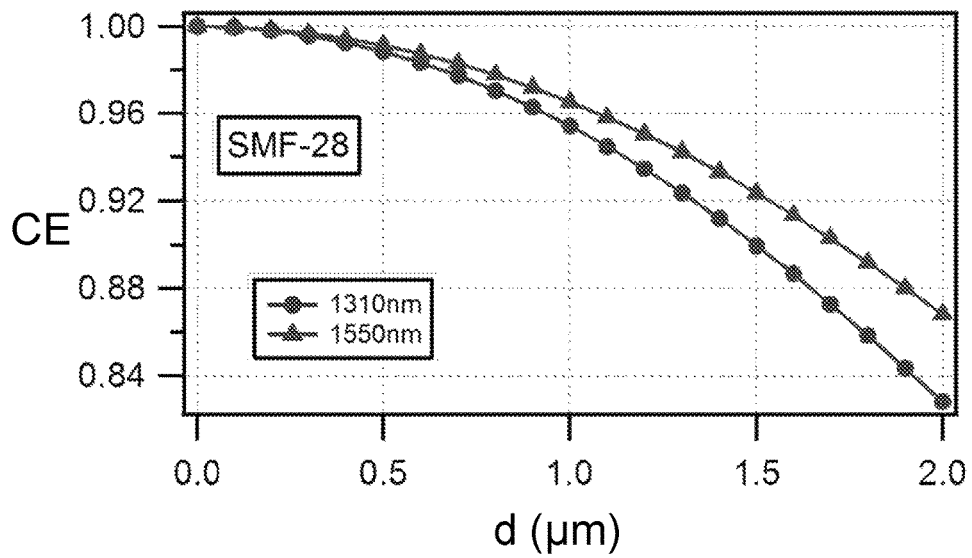
FIG. 5 is a plot of the coupling efficiency CE versus radial offset distance d (μm) for an SMF-28 single-mode fiber at 1310 nm (circles) and 1550 nm (triangles)

FIG. 5 plots the coupling efficiency CE as a function of radial offset distance d (μm) for SMF-28 single-mode optical fiber for λ=1310 nm (circles) and λ=1550 nm (triangles). For 0.25 dB (5.3%) of loss, the radial offset distance d<1.1 μm, and for 0.1 dB (2.3%) of loss, the radial offset distance d<0.7 μm. It is therefore important to be able to measure the core-ferrule concentricity to about 0.1 μm so that the uncertainty of the measurement is small compared to the radial offset tolerance.

Figure 6:
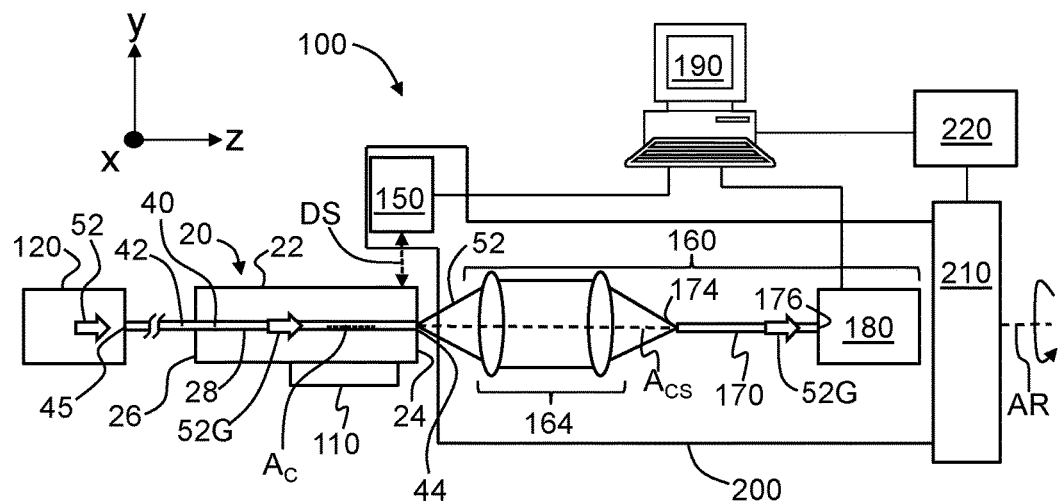
FIG. 6 is a schematic diagram of an example system for measuring core-ferrule concentricity.

FIG. 6 is a schematic diagram of an example system 100 for measuring the core-ferrule concentricity. System 100 includes a ferrule holder 110 that supports ferrule 20 with bare fiber section 40 residing within ferrule central bore 28. The ferrule central bore 28 is shown as lying nominally along the Z-axis. In an example, ferrule holder 110 comprises a support stage that is movable (translatable) in x, y and z directions so that ferrule 20 can be positioned as described below. An example ferrule holder 110 comprises a piezo-electric precision stage. In an example, a light source 120 is optically connected to an end 45 of optical fiber 42. Light source 120 emits light 52 that travels in optical fiber 42 as guided light 52G.

System 100 further includes a distance sensor 150 arranged relative to ferrule outer surface 22 and that measures a ferrule distance DS to the ferrule outer surface. Example distance sensors 150 include a laser triangulation gauge, a spectral interference gauge, a capacitance distance gauge, and an interferometer gauge. System 100 also has a core sensor 160 that in an example includes a light-collection optical system 164 and a sensing optical fiber 170 with an input end 174 and output end 176. The input end 174 of sensing optical fiber 170 resides at a focus of the light-collection optical system 164, while the output end is optically coupled to a photodetector 180. In an example, light-collection system 164 is configured as a substantially 1:1 imaging system. Core sensor 160 includes a core-sensor axis $A_{cs}$.

Distance sensor 150 and core sensor 160 are operably connected to a computer 190, which in an example is configured to perform data processing and optionally perform control functions for system 100. Distance sensor 150 and core sensor 160 are arranged so that they can rotate together about a rotation axis AR that lies nominally along the Z-axis. In an example, distance sensor 150 and core sensor 160 are mounted to a common rotatable support member 200 that is attached to a rotation stage 210. An example rotation stage 210 is an air-bearing stage. In an example, rotation stage 210 is operably connected to computer 190. In an example, the rotation angle θ of rotation state 210 is tracked by an angle encoder 220 that is operably connected to computer 190 and the rotation state.

In the general operation of system 100, light 52 from light source 120 is coupled into optical fiber 42 and travels down the optical fiber as guided light 52G. This guided light 52G travels through bare fiber section 40 that resides within ferrule central bore 28. The guided light 52 exits front end 44 of bare fiber section 40 as divergent light 52. Meanwhile, distance sensor 150 and core sensor 160 are rotated about axis of rotation AR, which is offset from the fiber core central axis $A_c$.

Figure 7:
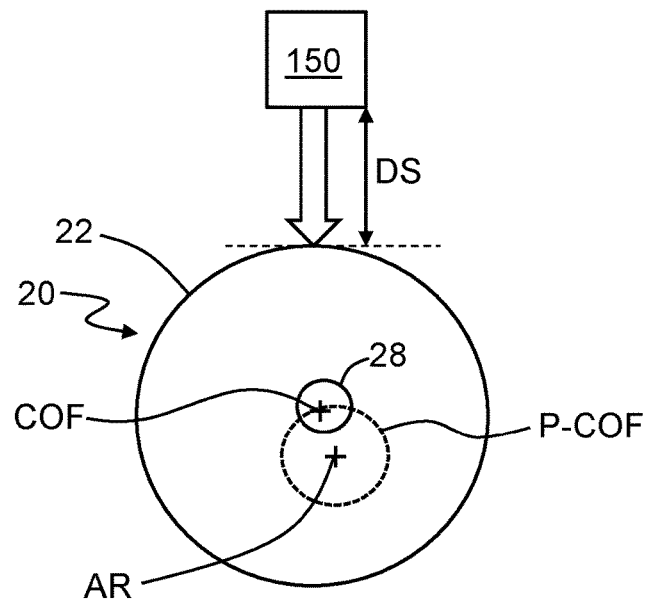
FIG. 7 is an end-on view of the front end of the ferrule, showing the center of ferrule (COF) and the offset location of the axis of rotation (AR)
Figure 8:
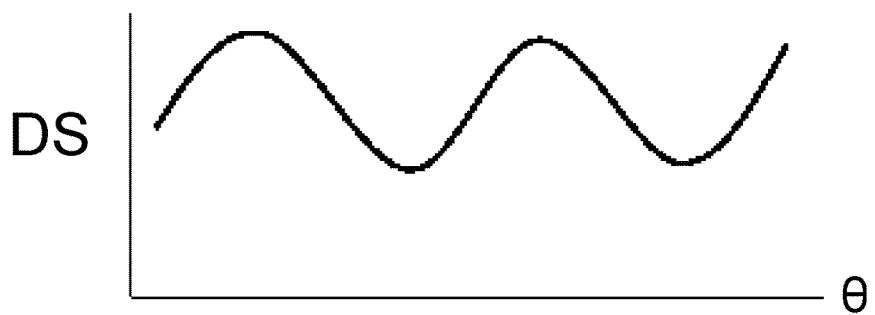
FIG. 8 is a plot of the ferrule distance DS between the ferrule outer surface as measured by a distance sensor as a function of angular rotation of the ferrule, wherein the plot has a sinusoidal form due to the axis of rotation being offset from the center of ferrule (COF)

FIG. 7 is an end-on view of ferrule 20 and shows a center of the ferrule ("center of ferrule") COF and the location of the axis of rotation AR, which is offset relative to the center of ferrule COF. Note that the center of ferrule COF is not in the center of central bore 28. This means that when bare optical fiber section 40 is arranged in bore 28 (see FIGS. 9 and 10, introduced and discussed below), its core 50 will not be coincident with center of ferrule COF. The path P-COF of the center of ferrule COF during the rotation about axis of rotation AR is shown as a dashed-line circle. The resulting measurement of the ferrule distance DS as measured by distance sensor 150 is shown in FIG. 8, which plots the ferrule distance DS versus the rotation angle θ of the ferrule. The plot of FIG. 8 has a sinusoidal shape due to the offset rotation. The plot may also contain an additional oscillation component due to ferrule 20 being out of round, but this component is usually quite small when compared to the larger oscillation from the offset rotation.

Figure 9:
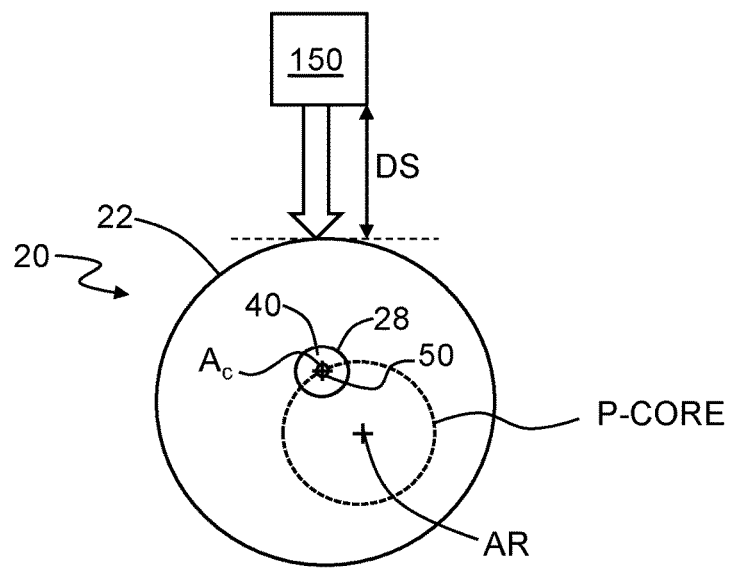
FIG. 9 is similar to FIG. 7 and shows a path (P-CORE) of the core of the optical fiber held by the ferrule as the fiber connector is rotated about the axis of rotation (AR)
Figure 10:
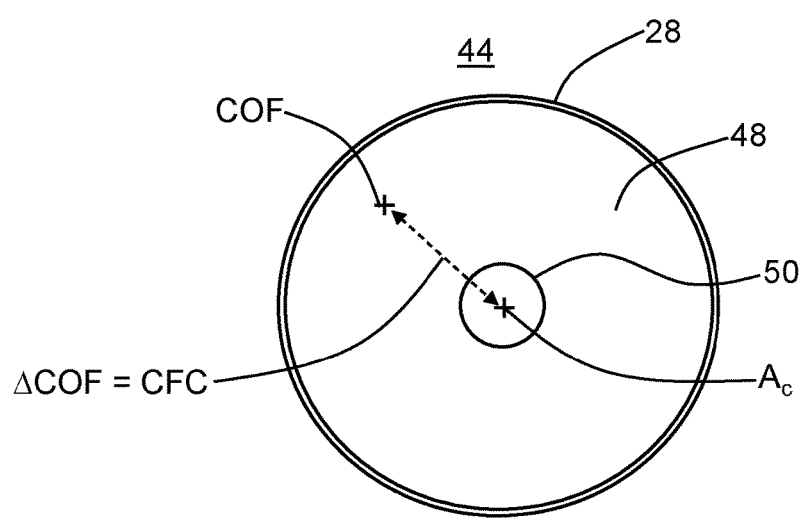
FIG. 10 is a close-up end-on view of the ferrule central bore showing the center of ferrule (COF) and the core of the optical fiber held in the central bore, with the core-ferrule concentricity (CFC) being the distance from the axis ($A_c$) of the optical fiber core and the center of ferrule (COF)

FIG. 9 is similar to FIG. 7 and shows a path P-CORE of core 50 (i.e., core axis $A_c$) of bare fiber section 40 relative to the axis of rotation AR. If core axis $A_c$ of core 50 were located on the axis of rotation AR, then core sensor 160 (FIG. 6) would receive a substantially constant amount of light from the core and form an image of the core onto the input end 174 of optical fiber 170. The light received by sensing optical fiber 170 would then be carried to photodetector 180, which would detect a substantially constant amount of optical power. However, since core axis $A_c$ of core 50 is offset from the axis of rotation AR by a distance ΔCOF, the amount of light captured by core sensor 160 varies as a function of rotation angle θ since the core position changes as a function of rotation angle.

In an example embodiment, ferrule 20 and bare fiber section 40 can be rotated, as described in an example embodiment of system 100 set forth below. However, rotating ferrule 20 may be less practical if it is connected to a long fiber or to a bulky set of other optical fiber connectors.

If ferrule 20 is perfectly round, and if the center of ferrule COF lies exactly on the axis of rotation AR, then the ferrule distance DS will not change as the rotation angle θ changes. These two conditions very rarely occur naturally in practice. Thus, nominal alignment will essentially always place the center of ferrule COF and axis of rotation AR in close enough alignment to obtain a modulated distance signal DS. The amplitude of the modulated signal for ferrule distance DS gives the radial displacement of the center of ferrule COF from the axis of rotation AR. The phase of the modulated signal gives the angle location of the COF relative to any angle-encoded position of ferrule 20.

Likewise, nominal alignment of core 50 and axis of rotation AR will generally give rise to a modulated optical power signal from photodetector 180 that corresponds to the position of core 50. As with the distance signal DS, the magnitude and phase of the modulated power signal will allow one to estimate the core distance and direction from the axis of rotation AR. Because the distance sensor 150 and core sensor 160 rotate together by virtue of being fixed to rotatable support member 200, their measurements are referenced to a common reference, namely the axis of rotation AR. The optical power data obtained in this manner by core sensor 160 is one example of core location data.

An example method of measuring the core-ferrule concentricity based on the ferrule distance data obtained from distance sensor 150 and core location data from core sensor 160 of system 100 can thus be described as follows. First, set the distance sensor 150 and core sensor 160 in rotation about axis of rotation AR. Second, adjust the position of core 50 using ferrule holder 110 so that the core is aligned with the axis of rotation AR, i.e., the core central axis $A_c$ is aligned with axis if rotation AR. This alignment can be achieved using the optical power data by substantially eliminating the modulation of the power signal of photodetector 180 of core sensor 160 so that the power measurement of the power data is substantially constant. Third, record the distance signal DS as a function of rotation angle θ to generate the ferrule distance data. Fourth, from the amplitude and phase of the distance signal DS vs. rotation angle θ of the ferrule distance data, calculate the distance ΔCOF of the center of ferrule COF relative to the axis of rotation AR. Since core 50 was set to be aligned with the axis of rotation AR using the optical power data, the distance ΔCOF is the same as the COF-to-core distance, i.e., the core-ferrule concentricity CFC, as illustrated in the close-up view of ferrule bore 28 and front end 44 of ferrule 20 of FIG. 10.

In an example embodiment, the rotation of distance sensor 150 and core sensor 160 is carried out within an angular range of 0°≤θ≤360°, so that when a full rotation has been achieved, the rotation direction is reversed to keep the rotation angle within the stated range. This limit on the rotation angle θ limits the amount of twisting of electrical and optical cables connected to distance sensor 150 and core sensor 160, which in turn avoids the need to employ rotational feed-through devices to accommodate continuous single-direction rotation. In an example embodiment, distance and power measurements using distance sensor 150 and core sensor 160 are made at select angular positions within the angular range of 0°≤θ≤360°, e.g., 0°, 30°, 45°, 60°, etc. Such selective measurements can in some cases provide sufficient data to get a good measurement of the core-ferrule concentricity.

Monitoring the Ferrule Location

As described above, distance sensor 150 monitors a point location on the outer surface 22 of ferrule 20. As ferrule 20 rotates, the ferrule distance DS between outer surface 22 and distance sensor 150 changes. The sensor needs to detect changes in the ferrule distance DS to high precision (e.g., <0.1 μm), but knowledge of the absolute location relative to another point in system 100 is not required.

Figure 11:
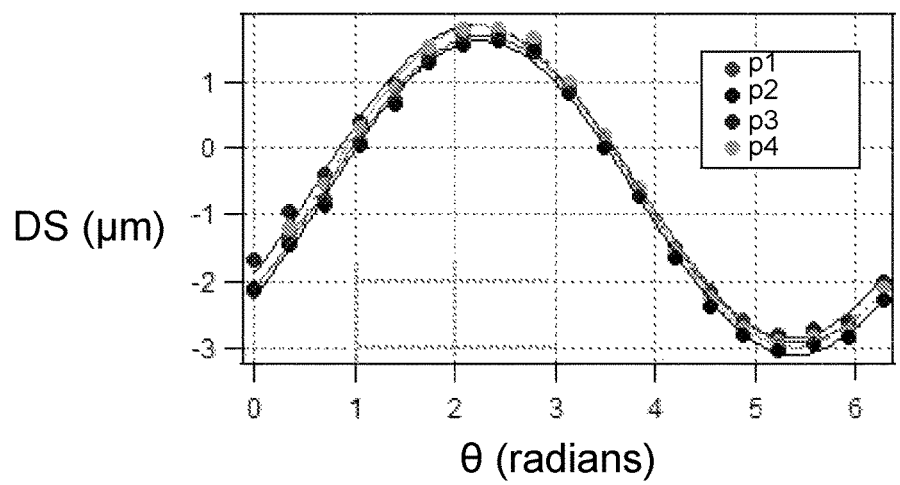
FIG. 11 is a plot of the ferrule distance DS (μm) from a sensor to the ferrule outer surface versus the rotation angle θ (radians) as taken for four different positions p1 through p4 along the length of the ferrule.

FIG. 11 is a plot of ferrule distance DS (μm) versus rotation angle θ (radians) as taken using a spectral-interference-based distance sensor 150, namely, a SI-F10 series microhead spectral interference displacement meter from Keyence Corp of Itasca, Ill. This particular distance sensor 150 uses a Fabry-Perot-based spectral interference method to evaluate the distance between a reflective surface and a sensor head. It interrogates the object under test using a probe beam having a diameter of about 40 μm. The plot of FIG. 11 shows the expected sinusoidal oscillation due to ferrule 20 being offset from the axis of rotation AR. The measurements were taken at four different positions p1 through p4 along the length of ferrule 20.

To determine the exact offset of the center of ferrule COF from the rotation axis AR, the ferrule distance DS data was processed using an "in-phase" and "quadrature" method. The in-phase portion I of the distance signal was calculated as:

$$I = \sum_i \lceil \cos(2\pi\theta_i) DS_i \rceil. \tag{3}$$

Here the summation i is over the measurements of ferrule distance DS at each angle θ. The quadrature portion Q is likewise expressed as:

$$Q = \sum_i [\sin(2\pi\theta_i)DS_i]. \quad (4)$$

From this data the amplitude A of the sinusoid is calculated as follows:

$$A = \sqrt{I^2 + Q^2}, \quad (5)$$

which is equal to the radial deviation of the center of ferrule COF from the axis of rotation AR, i.e., the core-ferrule concentricity CFC. Similarly, we can calculate the phase φ.

$$\phi = \tan^{-1}(Q/I), \quad (6)$$

The phase φ tells the "direction" of the core-ferrule concentricity relative to the angle measurement θ made by angle encoder 220.

Other methods can be used to evaluate the magnitude and direction of the concentricity CFC, such as least-squares fitting to a sinusoid. In any case, the absolute ferrule distance DS of the sensor to the ferrule does not matter, since it only forms the DC portion of the signal, which is irrelevant to the calculation of the radial offset or phase. Only the amplitude of the sinusoidal signal for ferrule distance DS matters for determining the radial offset. This means the measurement rejects slow drifts in the ferrule distance DS that may arise from effects like thermal expansion. Of course, if the ferrule 20 is drifting relative to the actual axis of rotation AR, distance sensor 150 will detect that drift as a change in amplitude.

A series of characterization tests were performed using system 100. Since many independent readings of the power P and the ferrule distance DS are made for each rotation, and the "I" and "Q" calculations use all of this data, the net result of the measurement is of much higher precision than any individual measurement. In this case, the rotation angle θ is measured using angle encoder 220, which allows for 90,000 samples per rotation. The short-term noise of the measurement of ferrule distance DS with distance sensor 150 was determined to be 10 nm, and the drift of the measurement was about 50 nm over tens of minutes.

Figure 12:
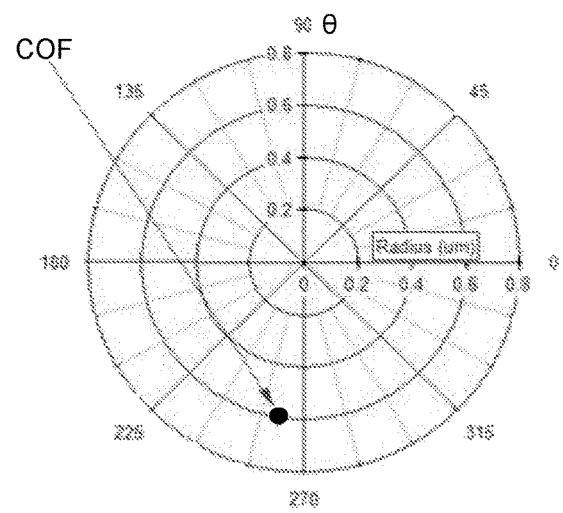
FIG. 12 is a polar plot that shows the results of a twenty minute scan of the ferrule using the system of FIG. 6 for over 1400 rotations, wherein center of ferrule (COF) is shown located at about θ=262.5° at a radius r=0.4 μm.

FIG. 12 is a polar plot that shows the results of a twenty minute scan of ferrule 20 using distance sensor 150 over 1400 rotations. The center of ferrule COF is shown located at about θ=262.5° at a radius r=0.6 μm. The data point showing the center of ferrule COF in FIG. 12 represents data superimposed at the same magnitude and phase as taken over the length of the experiment.

Figure 13:
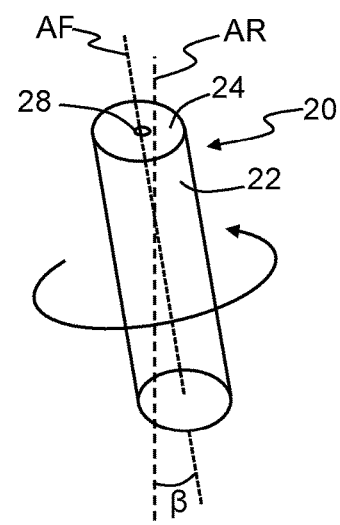
FIG. 13 is a schematic diagram that shows an example ferrule with its central axis (AF) tilted relative to the axis of rotation (AR)

FIG. 13 is a schematic diagram that shows an example ferrule 20 that has an axis AF that is is tilted relative to axis of rotation AR by an angle β. Such a tilt needs to be accounted for since it will result in a change of the measurement of the ferrule distance DS as function of axial position along the length of ferrule 20 (i.e., along the Z-direction). An experiment was performed where an intentional tilt of ferrule 20 was introduced and distance measurements made at different positions along the length of ferrule 20.

Figure 14:
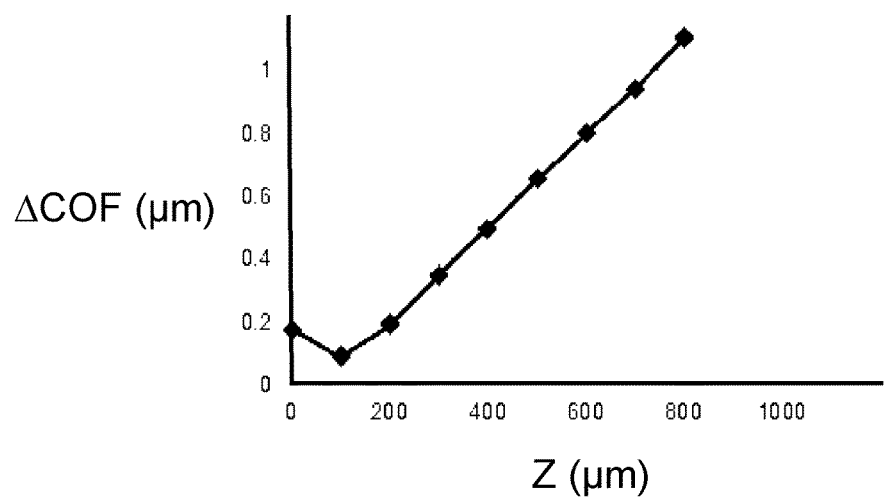
FIG. 14 is a plot of the center-of-ferrule offset ΔCOF (relative to the axis of rotation AR) (μm) versus the z position (μm) along the ferrule for a ferrule tilt angle β of 0.082°, with the plot showing how the value of ΔCOF can change substantially with z position even with a relatively small amount of ferrule-axis tilt.

FIG. 14 is a plot of the center-of-ferrule offset ΔCOF (relative to the axis of rotation AR) (μm) versus the z position (μm) along ferrule 20 for a ferrule tilt angle of β=0.082°. The plot of FIG. 14 shows that the value of ΔCOF can change substantially with z position even with a relatively small amount of tilt.

To mitigate the adverse effects of ferrule tilt, the measurement of ferrule distance DS can be performed as close to front end 24 of ferrule 20 as possible. The presence of bevel 25, however, may require that the distance measurement be made at some distance away from front end 24, e.g., 0.5 mm or so. If this is the case, then in an example the ferrule tilt angle β can be kept below 0.2 mrad to limit the tilt-induced bias error on the measurement of ΔCOF (and thus the measurement of core-ferrule concentricity CFC) to 0.1 μm. This accuracy can be achieved with precision mounts.

Another approach is to measure the center of ferrule COF at various z-locations, and then use this information to calculate the ferrule tilt. This information is then used to extrapolate the location of the center of ferrule COF at ferrule front end 24. For example, the data shown in FIG. 14 may be used to calculate the core-ferrule concentricity CFC at ferrule front end 24. This technique has the advantage of widening the angular mounting tolerances on the ferrule. Likewise, two distance sensors or a single sensing beam split into two may simultaneously monitor ferrule 20 at two different z-heights. If the z-height distance between the two sensing locations is known, then the difference in COF location between the two signals may be used to calculate the ferrule tilt, making scanning along the z-axis unnecessary. Each of these techniques requires that the z-height or longitudinal location of the interrogation spot relative to front end 24 鐸믈 rrule 10 be known accurately. But if the tilt angle β is measured to an accuracy of 0.1 mrad, then the z-location of ferrule 20 need only be established to about 1 mm to keep the final measurement error below 0.1 μm.

The measurement data for ferrule distance DS can be used to garner additional information about ferrule 20. For example, the residuals to a fit to a perfect sinusoidal curve for ferrule distance DS versus rotation angle θ are indicative of the non-roundness (ellipticity, etc.) of the outer diameter of the ferrule. Furthermore, if ferrule 20 is made intentionally non-round, such as an ellipse or a "keyed" design to set the orientation inside a connector, then the above methods will still work. In such a case, the direction of the non-round feature and ultimately the core offset can be evaluated relative to one another.

Monitoring the Fiber Core Location

Figure 15:
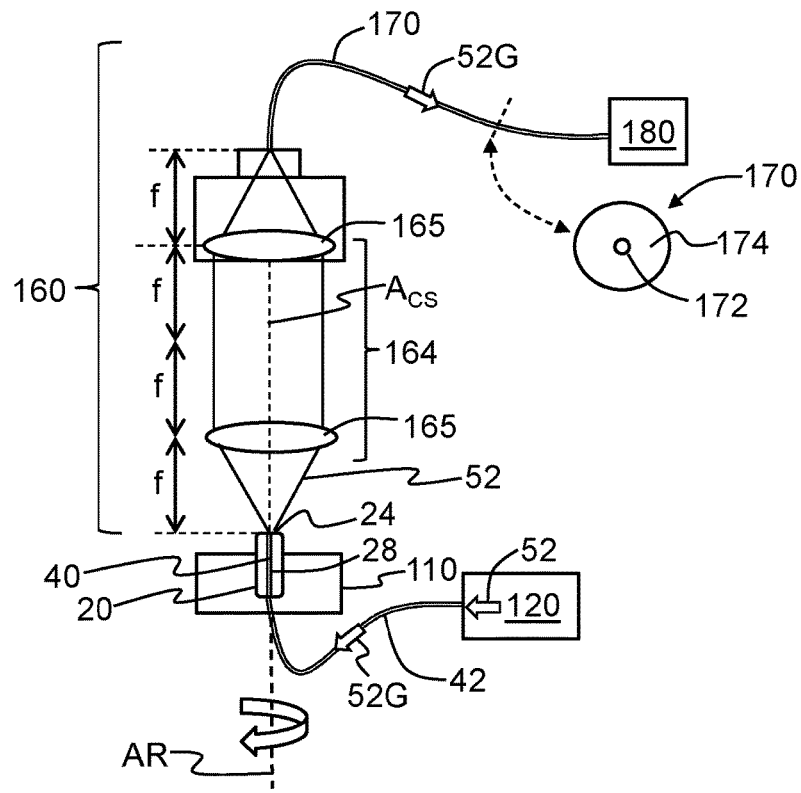
FIG. 15 is a schematic diagram of an example core sensor.

FIG. 15 is a schematic diagram of an example core sensor 160 shown arranged relative to ferrule 20, with bare fiber section 40 held in ferrule central bore 28 (FIG. 1). Light-collection optical system 164 is shown as having lenses 165 of focal length f, with the lenses spaced apart in a manner that creates a 1:1 imaging system. In an example, sensing optical fiber 170 is single mode. The close-up inset of FIG. 15 shows sensing optical fiber 170 as having a core 172 surrounded by a cladding 174. Core sensor 160 has the aforementioned central axis $A_{cs}$.

Figure 16:
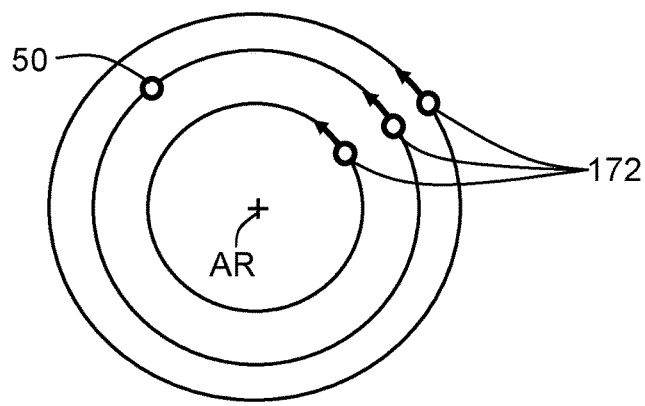
FIG. 16 is a schematic diagram that shows the apparent location of the optical fiber core seen as the core sensor is rotated about the axis of rotation (AR)
Figure 17:
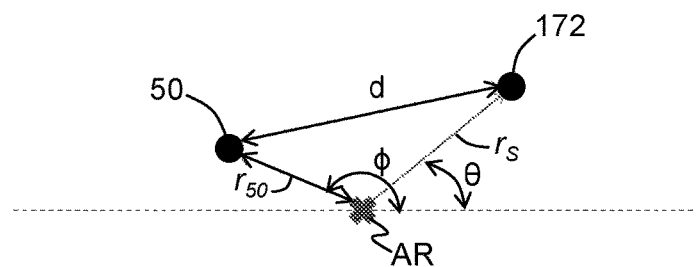
FIG. 17 is a schematic diagram that shows the center of rotation and the radial offset distance d between the two optical fiber cores.

If sensing optical fiber 170 or the entire core sensor 160 is rotated, then the sensing fiber core 172 will execute a circular motion about the axis of rotation AR, as illustrated in the schematic diagram of FIG. 16. The core 50 of bare optical fiber section 40 held within ferrule 20 will be located at an initial location that is also some distance from axis of rotation AR. The rotation of core sensor 160 causes an oscillation in the coupled optical power P between optical fiber 42 and sensing optical fiber 170. Referring also to the diagram of FIG. 17, the following equation (7) describes the distance d between the two fiber cores 50 and 172 in polar coordinates:

$$d^2 = (r_s \cos\theta - r_{50} \cos\phi)^2 + (r_s \sin\theta - r_{50} \sin\phi)^2 \quad (7)$$

where $r_s$ and $r_{50}$ are the distances of the respective fiber cores 50 and 172 from the axis of rotation AR, and θ and φ are the angles the each fiber location makes with an arbitrary system axis. If φ=0 is defined as the zero-angle axis of the system, and the above terms are expanded, then:

$$d^2 = r_s^2 + r_{50}^2 - 2r_s r_{50} \cos\theta \qquad (8)$$

The first two terms are simply a DC offset, and the last term shows the modulated separation that oscillates as the rotation angle θ of the system changes. The above expression can then be inserted in equation (2) to calculate the coupled power P as a function of rotation angle θ.

Unlike the modulated signal for the ferrule distance DS obtained during rotation, the corresponding modulated coupled power signal P obtained during rotation is not always a sinusoid. This is because the exponential function of equation (2) introduces a non-linear coupling response as a function of the radial offset distanced.

In an example embodiment, axis $A_{cs}$ of core sensor 160 is laterally offset from the axis of rotation AR. If sensing optical fiber 170 were exactly on the axis of rotation AR, there would be no modulated coupling signal at all, no matter the location of core 50. Likewise, if sensing optical fiber 170 is extremely far away from axis of rotation AR, it is unlikely that there would be any coupled power at all. In an example, core 172 of sensing optical fiber 170 is offset relative to the axis of rotation AR to correspond to the maximum derivative in the Gaussian coupling function of equation (2). The exact radial offset distance d for this condition depends on the mode field diameter and the magnification of the light-collection optical system 164, but for typical single mode fibers used in telecommunications, this maximum derivative occurs at a radial offset distance d of about 4 microns.

Figure 18:
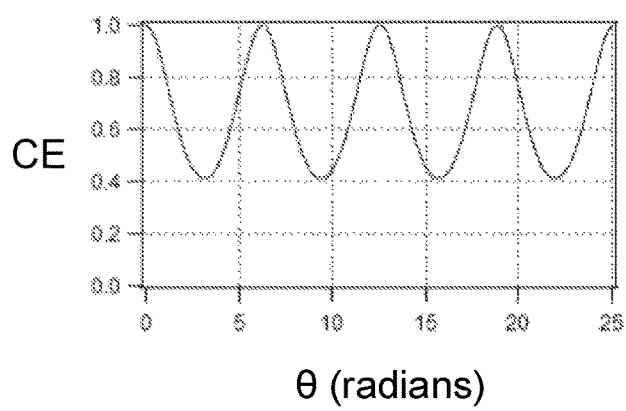
FIGS. 18 and 19 are plots of the coupling efficiency CE versus the rotation angle (radians) illustrating how different radial offsets affect the coupling efficiency.
Figure 19:
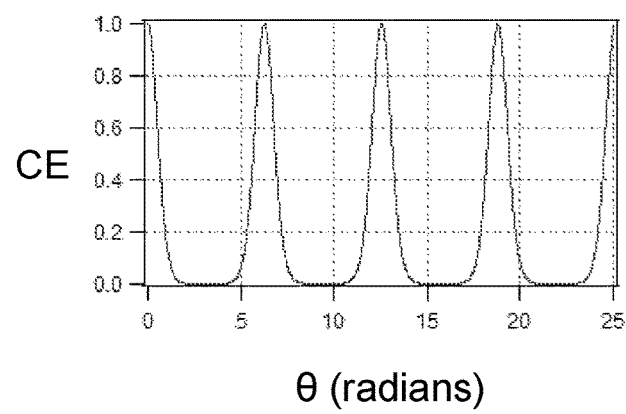

FIGS. 18 and 19 are plots the coupling efficiency CE versus rotation angle θ (radians) based on the modeled expected modulated coupled power for two different locations of core 50 of bare fiber section 40 and core 172 of sensing optical fiber 170. In the first case corresponding to FIG. 18, the sensing optical fiber core 172 is rotated at a radius $r_s$=2.5 μm about the axis of rotation AR, and core 50 is $r_{50}$=2.5 μm from the axis of rotation. In this case, the modulated signal is similar to a pure sinusoid, with a peak coupling efficiency of CE=1 when the two cores 50 and 172 overlap (i.e., are perfectly aligned). But the modulated signal never goes close to zero, as the two cores are never more than 5 μm apart.

In the second case corresponding to FIG. 19, the sensing optical fiber core 172 is rotated at a radius of $r_s$=7.5 μm about the axis of rotation AR, and core 50 is also $r_{50}$=7.5 μm from the axis of rotation. Now the modulated signal has a minimum much closer to zero, but the signal no longer looks like a sinusoid and in fact is more like a series of concatenated Gaussians. In both cases, the maximum coupling efficiency CE reaches 1 (100%), since the two cores 50 and 170 are located the same radial distance from the axis of rotation AR, and hence will completely overlap at some rotation angle θ.

Regardless of the exact fiber core locations used, the method of determining the core-ferrule concentricity CFC is the same. During rotation, the coupled power P between bare fiber section 40 held within ferrule 20 and sensing optical fiber 170 of core sensor 160 will produce a modulation. The position of bare fiber section 40 is then adjusted (e.g., via translatable ferrule holder 110) to drive the modulated power signal to zero, which occurs when core 50 is coaxial with the axis of rotation AR. This positioning can be done by using piezoelectric-actuated ferrule holder 110 and a control loop with computer 190 of system 100.

To obtain the best measurement accuracy, ferrule holder 110 should have high position resolution (e.g., <0.1 μm), but need not have a large travel range, with 100 μm being adequate for most cases. It is not necessary to have any angle encoder on the actuated stages, as how far the part moves is not needed for the core-ferrule concentricity measurement. As long as the drift of the actuators is slow compared to the subsequent ferrule measurement—which takes only a few seconds—then the stability of the stage and actuators is not critical. A control loop can be used to hold core 50 aligned to the axis of rotation AR during the subsequent reading(s) of the ferrule position.

The sensing optical fiber 170 can be most any type of fiber and have essentially any core diameter, but the choice of using an identical fiber to optical fiber 42 will typically lead to good spatial sensitivity. Non-unity magnification imaging for light-collection optical system 164 can also be used. In general, it is desirable to have a coupling efficiency CE that is as narrow as possible (i.e., is maximally sensitive) as a function of radial offset. This allows for the largest rate of change in the modulation amplitude of the measured optical power P as a function of the ferrule distance DS, making for more precise nulling (i.e., zeroing out the modulation) of the signal and hence more accurate placement of core 50.

In an example, light-collection optical system 164 of FIG. 15 is designed as a "4f" system—that is, the two lenses 165 are identical, and separated by two focal lengths 2f, and the distance from the lenses to the respective fiber cores 50 and 172 is also f. This makes for unity magnification between fiber 42 and sensing optical fiber 170. It also makes for a doubly telecentric light-collection optical system 164 whereby the entrance and exit pupils are at infinity. Telecentricity prevents changes in the radial location of any one fiber from causing angle-of-incidence changes at the other fiber. It is not essential that light-collection optical system 164 be doubly telecentric, though such a configuration has the advantage of making the light-collection optical system more tolerant to positional errors. Other light-collection optical systems 164 can be used, e.g., with longer or shorter focal length lenses, aspheric optics, mirrors, etc. In an example, light collection system 164 is substantially doubly telecentric and has substantially unit magnification.

Example System where Ferrule Rotates

Figure 20:
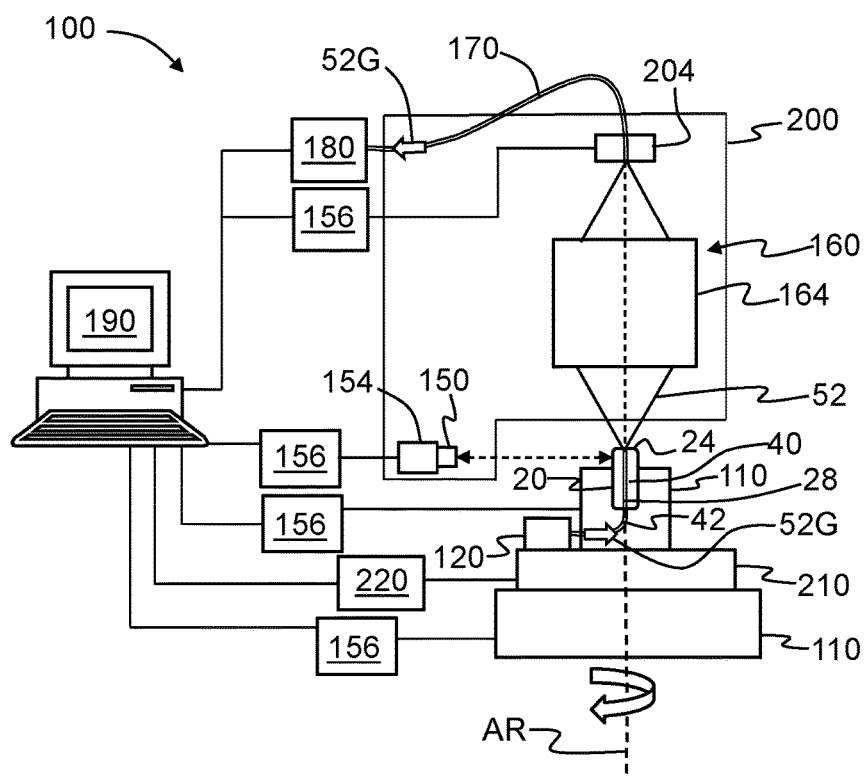
FIG. 20 is similar to FIG. 6 and illustrates an example embodiment of the system for measuring ferrule-core concentricity, wherein there ferrule rotates.

FIG. 20 is similar to FIG. 15 and illustrates an example embodiment of system 100 wherein ferrule 20 rotates. System 100 of FIG. 20 includes a translatable mount 204 that holds an end of sensing optical fiber 170, while the opposite end of the sensing fiber is optically coupled to photodetector 180. System 100 also includes the aforementioned rotation stage 210 on which (first) ferrule holder 110 resides. Ferrule holder 110 is translatable as discussed above. Rotation stage 210 is operably connected to angle encoder 220, which in turn is operably connected to computer 190. A second translatable ferrule holder 110 resides upon rotation stage 210. Light source 120 is shown as being supported by rotational stage 210. Distance sensor 150 is supported by a translatable support stage 154 so that the distance sensor can be moved to measure a different position along the length of ferrule 20. Support stage 154 is operably connected to a stage controller 156, which in turn is operably connected to computer 190. Support stage 204 and ferrule holder 110 are also operably connected to respective stage controllers 156, which are in turn operably connected to computer 190.

In an example, rotational feed-throughs are used to accommodate the rotation of ferrule 20 and, if the light source is chosen to be located off of the rotational stage 210, also the light source 120. As discussed above, in an example, the rotation about axis AR can be constrained to be in the range $0° \leq \theta \leq 360°$ to minimize strain on rotating optical and electrical cables.

Example Systems where Sensors Rotate

Figure 21:
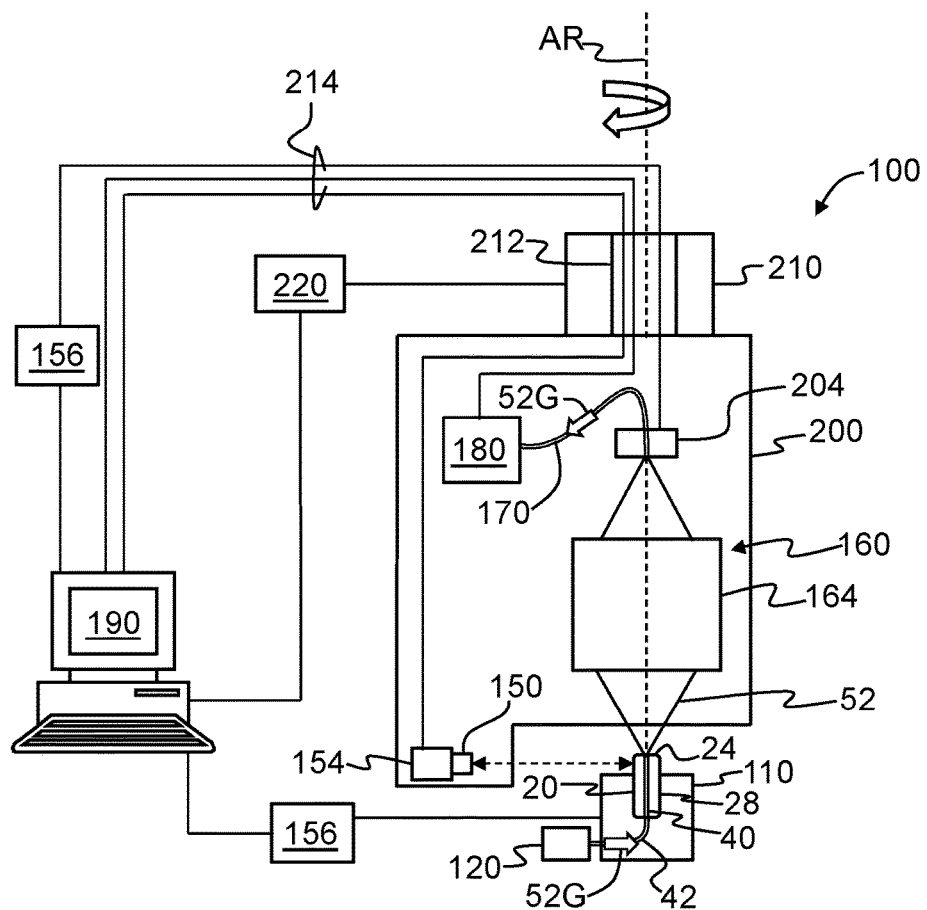
FIG. 21 is similar to FIG. 6 and shows another example system for measuring ferrule-core concentricity wherein the distance sensor and the core sensor rotate while the ferrule remains stationary.

FIG. 21 is similar to FIG. 6 and shows another example of system 100 wherein distance sensor 150 and core sensor 160 rotate together while ferrule 20 remains stationary. Rotation stage 210 is shown as having a rotational feed-through 212 through which connection lines 214 from photodetector 180, support stage 154 and support stage 204 pass. Connection lines 214 can be optical and/or electrical. Rotational feed-through 212 allows for communication with photodetector 180, support stage 154 and support stage 204 while rotatable support member 200 rotates about rotation axis AR.

In an example, distance sensor 150 can communicate via electrical or optical signals. If the rotational feed-though 212 has small sources of noise that are a synchronous with rotation, these sources may perturb electrical signals and may be falsely perceived as distance changes. However, transmission of optical signals through rotational feed-through 212 has the advantage that the spectral interference distance calculation is, to a first approximation, not a function of the intensity of the optical power transmitted by the fiber. Optical signals can be passed through rotational feed-through 212, and then the distance calculation performed on the optical signals using computer 190 or a control device (not shown) located off of rotatable support member 200. Hence small disturbances in the coupling of the feed-through that could occur during rotation will not cause artifacts in the ferrule distance measurement.

Figure 22:
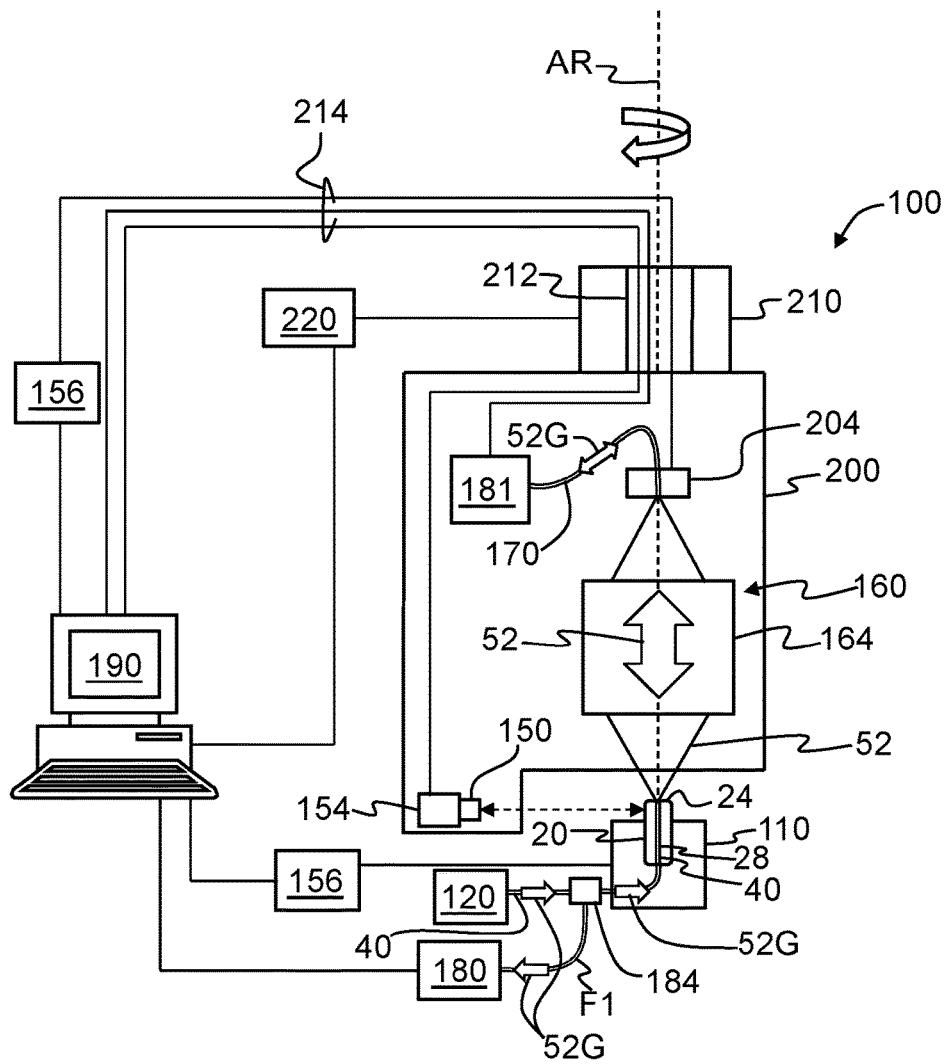
FIG. 22 is similar to FIG. 21 and illustrates an example system for measuring ferrule-core concentricity having a double-pass configuration.

FIG. 22 is similar to FIG. 21 and shows an example embodiment wherein photodetector 180 is replaced by a reflecting member 181, e.g., a fiber reflector. Further, a light-redirecting element 184, such as a fiber circulator, is arranged in optical fiber 42. A section F1 of optical fiber is optically connected at one end to light-redirecting element 184 and at its opposite end to photodetector 180. In this embodiment, light 52 from light source 120 travels over essentially the same optical path as described above, but now is reflected by reflecting member 181. The light 52 then travels back over most of the optical path (i.e., in the opposite direction) and is diverted by light-redirecting element 184 to fiber section F1 and to photodetector 184, which detects the returned light.

Figure 23:
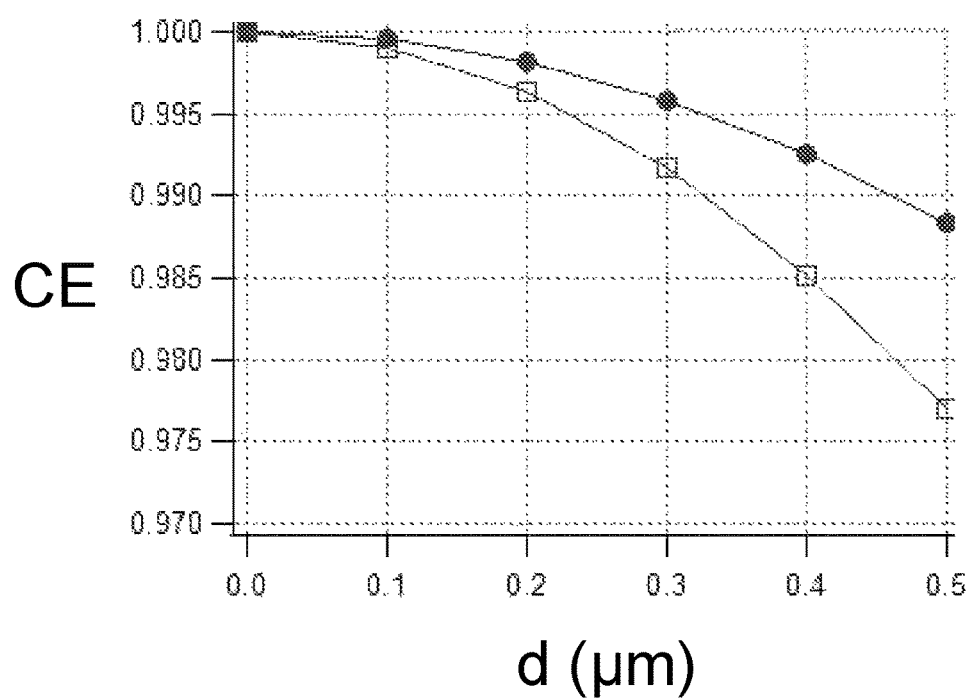
FIG. 23 is a plot of the coupling efficiency CE versus radial offset distance d (μm) illustrating how a double-pass system configuration (squares) has a greater sensitivity to the radial offset than a single-pass system (circles)

This double-pass configuration for system 100 has two main advantages. First, the rotating portion of system 100 that includes distance sensor 150 and core sensor 160 now has no powered components for emitting or detecting light 52. This makes for fewer signals that need to be passed through of the rotating portion of system 100. Second, since light 52 is now coupled twice between optical fiber 42 and sensing optical fiber 170, the sensitivity to the radial offset distance d is made even more pronounced. FIG. 23 is a plot of the coupling efficiency CE vs. radial offset distanced (µm) for system 100 operating in a single-pass configuration (circles) and double-pass configuration (squares). The coupling efficiency CE is noticeably more sensitive to the radial offset distance d for the double-pass configuration than for the single-pass configuration. This enhanced radial-offset sensitivity makes it easier to adjust system 100 to zero out the modulation in the detected optical power P, leading to improved positioning of core 50 relative to the axis of rotation AR.

Figure 24:
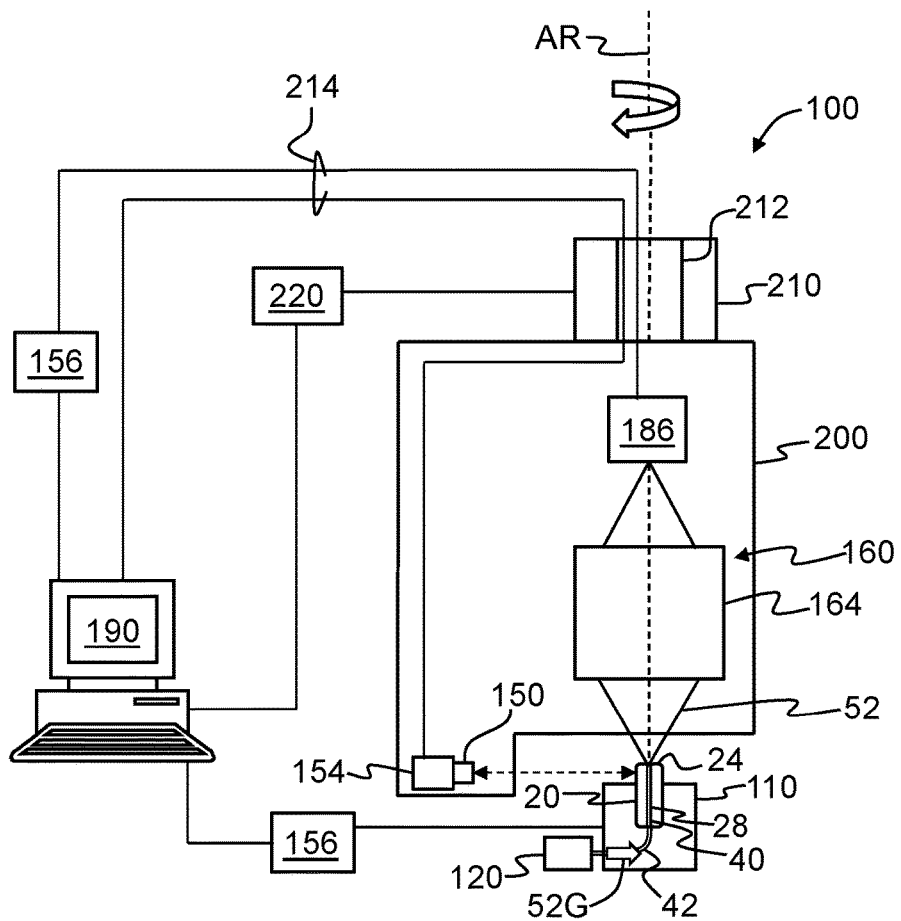
FIG. 24 is similar to FIG. 21 and illustrates an example system for measuring ferrule-core concentricity that utilizes a digital 2D image sensor in place of the sensing optical fiber and photodetector.

FIG. 24 is similar to FIG. 21 and illustrates an example embodiment of system 100 wherein sensing optical fiber 170 and photodetector 180 are replaced by a 2D image sensor 186 such as a CCD or CMOS sensor. Thus, light-collection optical system 164 and 2D image sensor 186 define a digital camera. As support member 200 rotates, the rotating position of core 50 of bare fiber section 40 as a function of time is recorded by 2D image sensor 186. In an example, the position of core 50 relative to the axis of rotation AR is determined from a series of digital images captured by 2D image sensor 186. The position of core 50 is then used as an input for calculating the distance between center of ferrule COF and core 50. This obviates the need to align core 50 with the axis of rotation AR. Thus, the digital images captured by the digital camera represent another example of core location data.

It is noted that the discussion above refers to optical fiber 42 as a single-mode fiber by way of example. Other types of optical fibers, such as multimode optical fibers, multicore optical fibers, etc. can also constitute optical fiber 42.

It is also noted that although methods are disclosed above where the axis of rotation is aligned with the optical fiber core and ferrule distance data (e.g., using distance sensor 150) is used to determine a position of the true ferrule center relative to the optical fiber core, the opposite could be done in alternative embodiments. That is, ferrule distance data may be used to determine a true ferrule center, which may then be aligned with the axis of rotation, at which point the position of the true ferrule center relative to the optical fiber core can be determined. The latter aspect may be achieved by measuring an amount of optical power emitted by the optical fiber core and received by a core sensor while rotating the ferrule about the axis of rotation, assuming the core sensor has been calibrated for offset distance.

It will be apparent to those skilled in the art that various other modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A system for measuring ferrule-core concentricity for an optical fiber held in a central bore of a ferrule, wherein the ferrule has a ferrule outer surface and a ferrule front end, and wherein a section of the optical fiber resides in the central bore of the ferrule at the ferrule front end, the system comprising:

a light source configured to be optically coupled to the optical fiber and emit light that travels through the optical fiber core and out of a front end of the optical fiber;

a distance sensor arranged to measure a ferrule distance between the ferrule outer surface and the distance sensor;

a core sensor arranged to receive and detect light emitted from the optical fiber core at the ferrule front end, the core sensor comprising a substantially doubly telecentric light-collection optical system that collects light emitted by the optical fiber core; and a rotatable support member that supports the distance sensor and the core sensor relative to the ferrule, the rotatable support member being configured to simultaneously rotate the distance sensor and core sensor about a common axis of rotation, wherein the distance sensor is configured to measure ferrule distance data during rotation and the core sensor is configured to measure core location data during rotation.

2. The system according to claim 1, wherein the core sensor comprises:
   a sensing optical fiber having a front end that receives the collected light; and
   a photodetector optically coupled to the sensing optical fiber and that detects the collected light from a back end of the sensing optical fiber.

3. The system according to claim 1, wherein the core location data comprises optical power data, and wherein the optical fiber core and the axis of rotation are aligned such that the optical power data is substantially constant.

4. The system according to claim 1, wherein the rotatable support member rotates between rotation angles in the range $0° \leq \theta \leq 360°$.

5. The system according to claim 1, wherein:
   the light-collection optical system forms an image of the front end of the ferrule and the optical fiber core; and
   the core sensor comprises a two-dimensional (2D) image sensor that receives the image of the front end of the ferrule and the optical fiber core and forms therefrom a corresponding digital image.

6. The system according to claim 1, wherein the core sensor comprises:
   a sensing optical fiber having a front end that receives the collected light and an opposite back end;
   a reflecting member arranged at the back end of the sensing optical fiber and that reflects the collected light back through the optical fiber and the light-collection optical system and to the optical fiber core;
   a light-redirecting element optically coupled to the optical fiber and that redirects the light from the light-collection optical system; and
   a photodetector optically coupled to the light-redirecting member and that detects the light from the light-redirecting element.

7. The system of claim 1, wherein the distance sensor is selected from the group of distance sensors comprising: a laser triangulation gauge, a spectral interference gauge, a capacitance distance gauge, and an interferometer gauge.

8. The system of claim 1, wherein the core location data comprises either optical digital images of the optical fiber core and ferrule front end or power measurements of light transmitted by the optical fiber core.

9. The system of claim 1, wherein:
   the system further comprises optical connection lines providing optical signal communication to the distance sensor and core sensor; and
   a rotation stage attached to the rotatable support member and comprising a rotational feed-through, wherein the optical connection lines pass through the rotational feed-through.

10. The system according to claim 9, wherein:
    the system further comprises a computer or control device that calculates the ferrule-core concentricity from a spectral interference distance calculation using the ferrule distance data and the core location data; and
    the spectral interference distance calculation is, to a first approximation, not a function of optical intensity of an optical signal transmitted by the optical connection lines such that disturbances in the coupling of the rotational feed-through that could occur during rotation will not cause artifacts in the concentricity calculation.

* * * * *